US012731370B2

(12) United States Patent
Choi et al.

(10) Patent No.: US 12,731,370 B2
(45) Date of Patent: Sep. 8, 2026

(54) METHOD OF PREDICTING CRASH PERFORMANCE BASED ON DEEP LEARNING

(71) Applicants: HYUNDAI MOTOR COMPANY, Seoul (KR); KIA CORPORATION, Seoul (KR); SOONCHUNHYANG UNIVERSITY INDUSTRY ACADEMY COOPERATION FOUNDATION, Asan-si (KR)

(72) Inventors: Jong-Hun Choi, Hwaseong-si (KR); Seong-Keun Park, Asan-si (KR); Dong-Hyun Lee, Yongin-si (KR)

(73) Assignees: HYUNDAI MOTOR COMPANY, Seoul (KR); KIA CORPORATION, Seoul (KR); SOONCHUNHYANG UNIVERSITY INDUSTRY ACADEMY COOPERATION FOUNDATION, Asan-si (KR)

( * ) Notice: Subject to any disclaimer, the term of this patent is extended or adjusted under 35 U.S.C. 154(b) by 221 days.

(21) Appl. No.: 18/773,037

(22) Filed: Jul. 15, 2024

(65) Prior Publication Data

US 2025/0104387 A1 Mar. 27, 2025

(30) Foreign Application Priority Data

Sep. 27, 2023 (KR) ........................ 10-2023-0130675

(51) Int. Cl.
*G06V 10/52* (2022.01)
*G06V 10/44* (2022.01)
(Continued)

(52) U.S. Cl.
CPC .............. *G06V 10/52* (2022.01); *G06V 10/44* (2022.01); *G06V 10/56* (2022.01); *G06V 20/70* (2022.01)

(58) Field of Classification Search
CPC ........ G06V 10/52; G06V 10/44; G06V 10/56; G06V 20/70; G01M 17/0078; G06N 3/04; G06N 3/08; G06T 7/90
See application file for complete search history.

(56) References Cited

U.S. PATENT DOCUMENTS

2018/0275667 A1* 9/2018 Liu .................... B60W 60/0011

FOREIGN PATENT DOCUMENTS

| | | | | |
|---|---|---|---|---|
| CA | 3028630 A1 * | 3/2019 | ............ | B60W 40/09 |
| CN | 114118139 A * | 3/2022 | ............ | G06N 3/045 |
| KR | 20160070979 A | 6/2016 | | |

OTHER PUBLICATIONS

Pawlus et al. "Reconstruction of crash pulse of a vehicle involved in central localized collision based on Morlet wavelets." Proceedings of the 31st Chinese Control Conference. IEEE, 2012. (Year: 2012).*

(Continued)

*Primary Examiner* — Ming Y Hon
*Assistant Examiner* — Dominique James
(74) *Attorney, Agent, or Firm* — Lempia Summerfield Katz LLC

(57) ABSTRACT

A method of predicting crash performance based on deep learning from vehicle crash acceleration data includes performing, by an input unit, wavelet transform on vehicle crash acceleration data. The method also includes applying wavelet transform data to a pre-trained model. The method also includes concatenating a feature extracted from the pre-trained model with a vehicle crash performance index. The method also includes calculating a crash prediction result in a crash performance model through artificial neural network learning from concatenated data of the vehicle crash performance index and the extracted feature.

8 Claims, 10 Drawing Sheets

(51) Int. Cl.
*G06V 10/56* (2022.01)
*G06V 20/70* (2022.01)

(56) References Cited

OTHER PUBLICATIONS

Pawlus et al. "Multiresolution wavelet-based approach to identification of modal parameters of a vehicle full-scale crash test." 2012 IEEE International Symposium on Intelligent Control. IEEE, 2012. (Year: 2012).*

* cited by examiner

FIG. 5

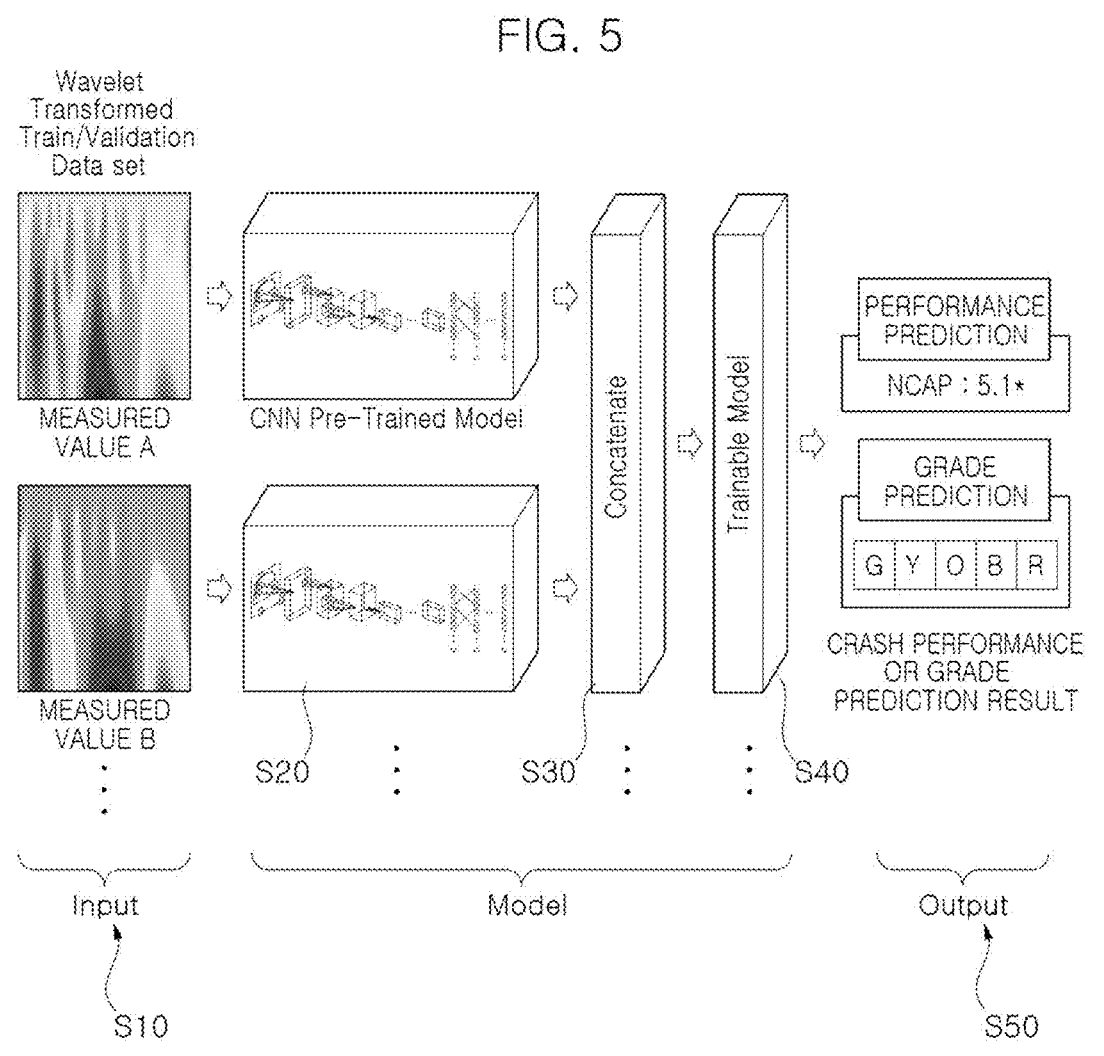

Wavelet Transformed Train/Validation Data set

MEASURED VALUE A

MEASURED VALUE B

CNN Pre-Trained Model

Concatenate

Trainable Model

PERFORMANCE PREDICTION

NCAP : 5.1*

GRADE PREDICTION

G Y O B R

CRASH PERFORMANCE OR GRADE PREDICTION RESULT

S20 S30 S40

Input Model Output

S10 S50

<Regression Network Architecture>

<Classification Network Architecture>

FIG. 7A

| | True Label Grade | | | |
|---|---|---|---|---|
| Predicted Grade | 1 | 2 | 3 | 4 |
| 1 | | | | |
| 2 | | | | |
| 3 | | | | |
| 4 | | | | |

CORRECT AREA

INCORRECT AREA $$\text{Accuracy} = \frac{TP + TN}{YP + TN + FP + FN} * 100\%$$

<Driver Classification Top-2 Accuracy>

<Passenger Classification Top-2 Accuracy>

FIG. 8

| Seat | Injury | Model | Accuracy | Error(MAE) |
|---|---|---|---|---|
| Driver | HIC15 | HIC-D1 | 69.96 | 54.98 |
| | NiJ | NiJ-D1 | 86.37 | 0.05 |
| | Neck Tension | Neck Tension-D2 | 81.32 | 265.82 |
| | Neck Comprsn | Neck Comprsn-D1 | 58.37 | 86.14 |
| | Chest Deflection | Chest Deflection-D1 | 85.40 | 3.09 |
| | 3ms Clip | 3ms Clip-D1 | 90.53 | 4.18 |
| | Left Femur | Left Femur-D1 | 50.63 | 409.05 |
| | Right Femur | Right Femur-D1 | 77.56 | 441.29 |
| Passenger | HIC15 | HIC-P1 | 86.68 | 37.76 |
| | NiJ | NiJ-P2 | 84.72 | 0.06 |
| | Neck Tension | Neck Tension-P1 | 81.68 | 135.43 |
| | Neck Comprsn | Neck Comprsn-P2 | 64.46 | 117.08 |
| | Chest Deflection | Chest Deflection-P1 | 81.86 | 2.20 |
| | 3ms Clip | 3ms Clip-P1 | 95.55 | 1.98 |
| | Left Femur | Left Femur-P1 | 58.11 | 517.36 |
| | Right Femur | Right Femur-P1 | 43.35 | 547.01 |

METHOD OF PREDICTING CRASH PERFORMANCE BASED ON DEEP LEARNING

CROSS REFERENCE TO RELATED APPLICATION

The present application claims priority to Korean Patent Application No. 10-2023-0130675, filed Sep. 27, 2023, the entire contents of which are incorporated herein for all purposes by this reference.

BACKGROUND

Field of the Disclosure

The present disclosure relates to a method of predicting crash performance based on deep learning by applying wavelet transform to crash acceleration data for a vehicle and using the results to build a learning model.

Description of the Related Art

With the development of the vehicle industry, each country's merchantability/legal regulations have been introduced to develop safe vehicles, and various technologies related, for example, to a body structure and the development for a restraint device are being developed to not only meet these requirements but also secure better safety. Vehicle manufacturers are conducting a real crash test to identify crash performance in a vehicle development stage, which results in considerable costs and man-hour (M/H). In order to reduce the costs and the M/H, research to predict crash performance in advance is being applied to vehicle development in order to reduce many costs and the M/H using a system unit test method, such as finite element analysis or sled evaluation, or the like.

Recently, a technique of predicting pedestrian's head injury has been developed using longitudinal and transverse (L/T) directional cross-section information of a vehicle and an artificial neural network technique. A method of predicting machine learning-based crash performance based on design information and accumulated test data in addition to a technique of predicting crash performance using a map learning (k-NN) model based on frontal crash performance index information, such as restraint energy (RTE), maximum dynamic crush (MDC), an occupant load criterion (OLC), and power electronics (PE), is attracting attention.

In order to generate a model that predicts crash performance through machine learning, such as a technique of using crash time series data as an input and using the data in a Time and Spectrogram Restoration Network (TSRNet) model in order to predict dummy injury in a preceding step, there is a need for the development for a machine learning model that may collect crash data (step 1), may perform pre-processing transformations and segmentation of collected data, such as normalization (step 2), may develop a machine learning model that can learn the segmented data (step 3), and may finally train, validate, and evaluate the model (step 4). In order to implement an effective machine learning-based model, a large amount of high-quality data is required, but it is difficult to secure a large amount of data due to the characteristics of the test causing considerable costs.

Therefore, in order to generate a model for a small amount of data, it is necessary to extract important information present in the data. To this end, a data processing process is performed that may extract patterns or relationships hidden in the data using domain knowledge in data pre-processing process.

In conventional pre-processing development processes, normalized time series data is used, or data with complicated and pieces of information is specified as one index and is applied to a learning model.

Crash performance indexes have a limit in accurately representing trends related to passenger injury as correlation. Also, other crash performance indexes that may quantitatively represent crash performance also have a limit. The subject matter described in this background section is intended to promote an understanding of the background of the disclosure and thus may include subject matter that is not already known to those of ordinary skill in the art.

SUMMARY

The present disclosure has been made in efforts to solve the above problems. The present disclosure is directed to building a model that images vehicle crash acceleration data in an energy unit by applying wavelet transform to the vehicle crash acceleration data to perform wavelet pre-processing on the vehicle crash acceleration data and predicts frontal crash performance.

The present disclosure provides a method of predicting crash performance based on deep learning including performing, by an input unit, wavelet transform on the vehicle crash acceleration data. The method also includes applying wavelet transform data to a pre-trained model. The method also includes concatenating a feature extracted from the pre-trained model with a vehicle crash performance index. The method also includes calculating a crash prediction result in a crash performance model through artificial neural network learning from concatenated data of the vehicle crash performance index and the extracted feature. The crash prediction result is an injury value or an injury grade, and the crash performance model includes a regression model that predicts an injury value or a classification model that predicts an injury grade.

In addition, a mother function of the wavelet transform may be selected as a Ricker wavelet.

In addition, the vehicle crash acceleration data may be classified into injury values of a driver and a passenger in a driver's seat and a passenger's seat.

In addition, the wavelet transform may image the vehicle crash acceleration data into image data. The wavelet-transformed image data may be image data with 3-channel R, G, B type colors, a color may indicate an energy coefficient, and the image data may be an image labeled so that an energy difference is represented as a color difference.

BRIEF DESCRIPTION OF THE DRAWINGS

FIG. 1A illustrates the vehicle crash acceleration data and FIG. 1B illustrates a wavelet-transformed result.

FIG. 2A illustrates a Ricker wavelet and FIG. 2B illustrates a Morlet wavelet.

FIG. 5 is a view illustrating a crash performance model architecture according to the present disclosure.

FIG. 6A is a view illustrating a deep learning classification model architecture learned in the present disclosure and FIG. 6B is a view illustrating a deep learning regression model architecture learned in the present disclosure.

FIGS. 7A and 7B are views illustrating prediction accuracy information, where FIG. 7A is a view illustrating a criterion in which prediction accuracy of the deep learning classification model learned in the present disclosure is evaluated and FIG. 7B is a view illustrating an accuracy result.

FIG. 8 is a view illustrating a prediction accuracy result of the deep learning regression model learned in the present disclosure.

DETAILED DESCRIPTION

Figure 1A:
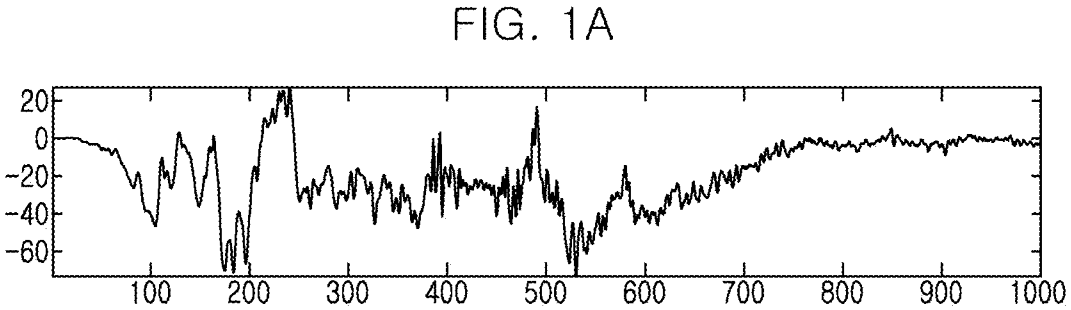
FIGS. 1A and 1B are views illustrating real images of pre-results and post-results transformed by applying wavelet transform to a crash acceleration data, where

Hereinafter, a crash performance model that applies wavelet transform according to the present disclosure to pre-processing of crash test data and uses the result is described with reference to the accompanying drawings. According to the present disclosure, a pre-processing process referred to as wavelet transform is introduced to crash acceleration data, and the result is applied to a learning model.

The acceleration data measured from a crash-tested vehicle has the form of an abnormal signal, is temporary, and has locally excessive change characteristics in a time domain. Therefore, in order to use the measured signal, noise needs to be removed, and in order to compare physical quantities, such as a vehicle impact, a vehicle speed, and a vehicle displacement over time, the measured signal is used by integral calculation or transform to an index after filtered. In other words, due to the excessive change characteristics of the vehicle crash acceleration data, it is necessary to apply a method of reflecting the crash characteristics of the vehicle from an original signal rather than interest in an instantaneous change in acceleration to the learning model.

According to the present disclosure, in order to develop a more effective crash performance model through machine learning, a system for imaging the vehicle crash acceleration data in an energy unit by performing wavelet pre-processing on the vehicle crash acceleration data and predicting frontal crash performance is configured.

First, the wavelet transform is formed of a set of special functions developed for the analysis of conventional wavelet signals and is a variation of the Fourier Transform.

Although the conventional Fourier transform transforms a signal using sine and cosine functions, the wavelet transform transforms conventional time series data in energy units of a frequency and a signal using a specific basis function. The basis function used in the wavelet transform is referred to as a mother function, and energy units of the frequency and the signal are formed through a scaling up and scaling down process based on the mother function.

The Fourier transform may be useful for analyzing periodicity rather than a short-time change based on the sine/cosine functions and may extract a specific frequency value for a signal related to a time. However, because a time domain is changed to a frequency domain, it is difficult to obtain information at a specific time point.

In order to overcome the disadvantage, short-time Fourier transform (STFT) that sets blocks in a unit of a constant time and applies Fourier transform has been developed. However, there is a disadvantage in that when the unit of the block is too small, frequency information is reduced, and when the unit of the block is too large, information in the time domain is reduced, and thus the resolution of the signal is degraded.

The wavelet signal transform for overcoming the limits of the Fast Fourier Transform (FFT) and STFT signal transform methods may analyze a complicated and abnormal time series data signal using a scaling technique of scaling-up or scaling-down a magnitude of the signal according to the time and a shifting technique of performing the parallel movement of the signal to a specific position on a time axis of the signal in order to display all of time information/frequency information.

Acceleration data is used to measure energy generated in a situation, such as an impact or crash. Because the wavelet transform is applied to the acceleration data and the energy generated due to crash may be extracted in the time-frequency domains, the acceleration data is widely used in the pre-processing process of extracting features of the data, and thus functions to increase the accuracy of a machine learning model.

Figure 1B:
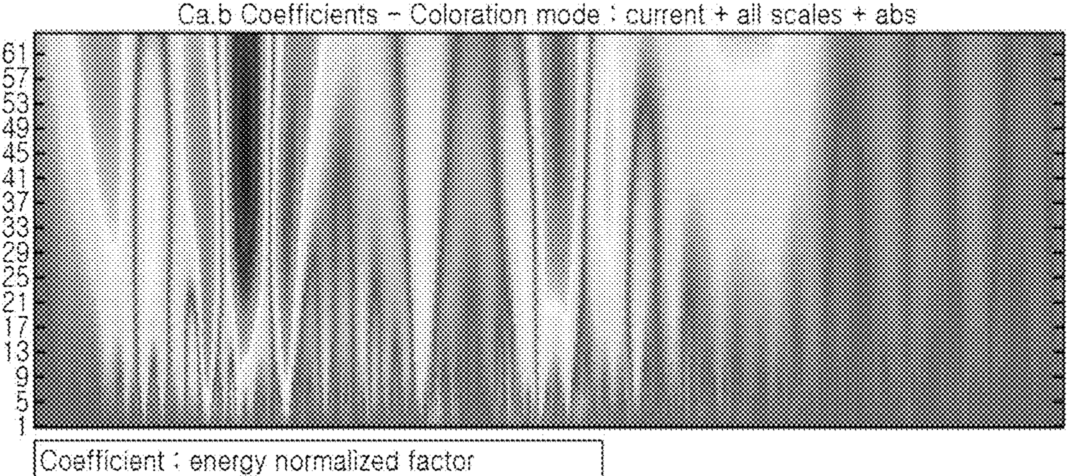

FIGS. 1A and 1B are views illustrating real images of pre-results and post-results transformed by applying wavelet to a crash acceleration data. In FIG. 1A, an X axis indicates a time domain, and a Y axis indicates a frequency (Hz) domain and FIG. 1B illustrates a wavelet-transformed result of FIG. 1A. In FIG. 1B, an X axis indicates the same time domain as the data (pulse) of FIG. 1A and a Y axis indicates a frequency scale. In the image illustrated in FIG. 1B, a color indicates an energy coefficient, and a unit is an energy normalized factor and indicates high and low energies depending on the color.

When the x-axis of FIG. 1A is applied equally, regions A, B, and C of FIG. 1B exhibit relatively high energy, with A being the highest energy region and B and C exhibiting smaller energy regions than A.

Figure 2A:
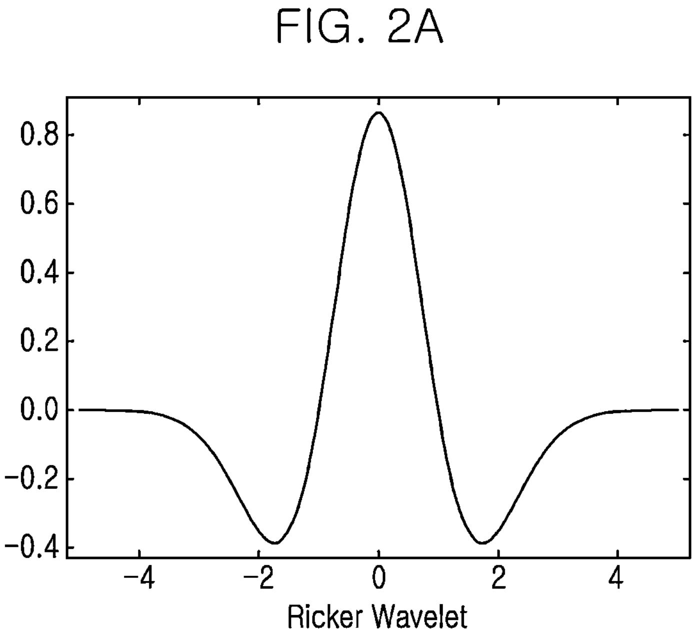
FIGS. 2A and 2B are views illustrating a representative mother function of the wavelet transform, where
Figure 2B:
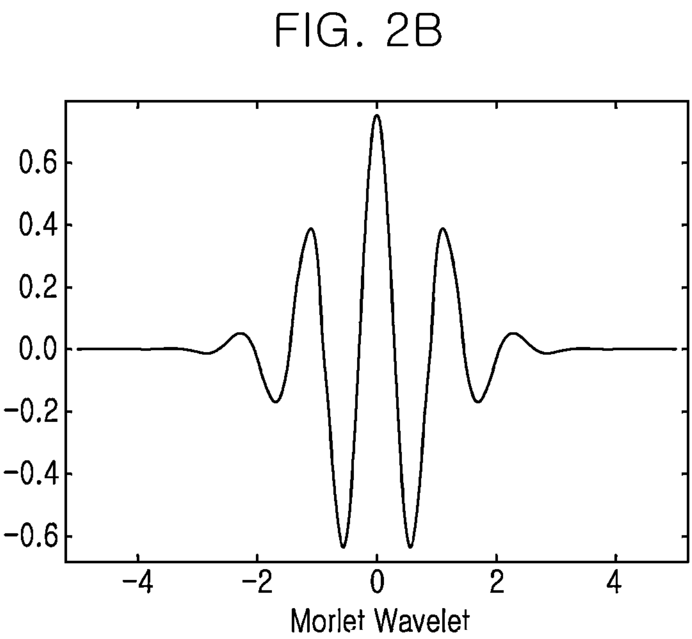

Meanwhile, the wavelet transform includes various types of mother functions as a basis function, and even when the same data is analyzed, the results vary depending on the selection of the mother function. Therefore, in order to select the mother function suitable for a crash pulse, two representative wavelet mother functions, Ricker and Morlet, are selected as illustrated in FIGS. 2A and 2B (see FIG. 8), and the vehicle crash acceleration data are transformed and compared. The Ricker wavelet is mainly used to identify trends in a time domain of time series data and the Morlet wavelet is a mother function mainly used for frequency spectrum analysis, frequency analysis, and the like.

Figure 3:
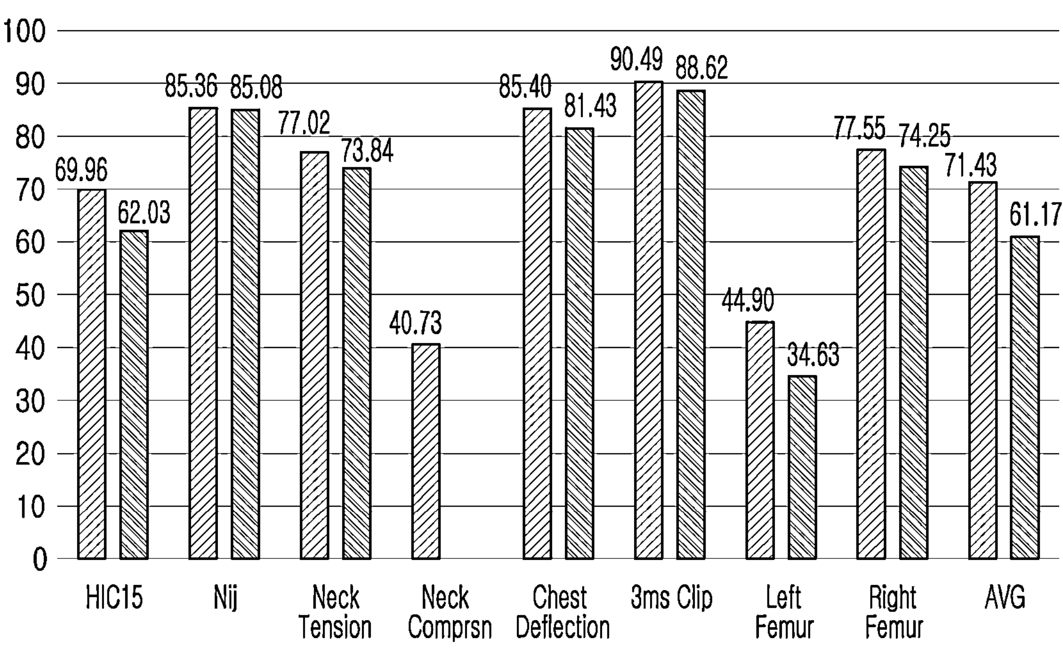
FIG. 3 is a view illustrating a correlation test and comparison for prediction of crash performance with respect to each of the Ricker wavelet and the Morlet wavelet.

In the present disclosure, in order to select the mother function suitable for the crash performance model, in FIG. 3 (see FIG. 9), correlation test and comparison for prediction of crash performance were conducted on each of the Ricker wavelet and the Morlet wavelet. In FIG. 3, an X axis indicates an injury part, and an Y axis indicates accuracy. As a result of performing deep learning according to the present disclosure by wavelet-transformed data for each mother function, it was confirmed that the Ricker wavelet showed excellent performance. Here, crash model items are head injury criterion (HIC), Neck Tension (Nij), g-force generated by 3 ms crash (3 ms Clip), chest deformation (Chest Deflection), neck compression (Neck Comprsn), left femur (Left Femur), and right femur (Right Femur).

Figure 4:
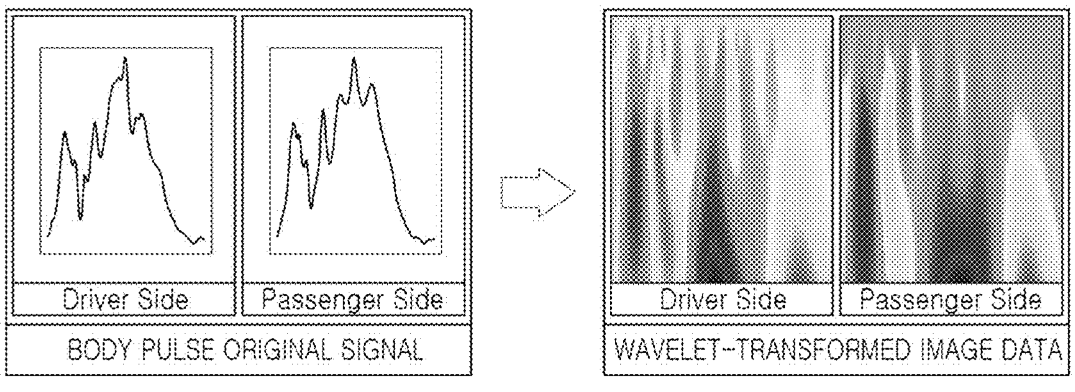
FIG. 4 is a view illustrating an image, which is image data, as a calculation result obtained through wavelet transform pre-processing.

In addition, in order to use result images calculated through the wavelet transform pre-processing as learning data in the deep learning model according to the present disclosure, the body acceleration data is transformed into an image, which is wavelet-transformed image data, in each of a driver's seat and a passenger's seat. In order to apply the image to the deep learning model according to the present disclosure, as illustrated in FIG. 4, the image is transformed into 3-channel R, G, B type image data and automatically converted into a database to label human body injury output data.

Meanwhile, the crash performance indexes include restraint energy (RTE), maximum dynamic crush (MDC), and rebound time (R/Time). The RTE (%) is a body pulse severity and refers to energy absorbed by a restraint device among all energies of a vehicle in the event of crash, and MDC (m) is a maximum displacement value of a vehicle and is a result of integrating an acceleration twice. The R/Time (sec) is an x-intercept time of a vehicle speed and is a result of integrating an acceleration once.

While the crash process is very complicated, there is a limit in representing the vehicle crash acceleration data as only a crash performance index, which is just a quantitative value. Therefore, since the wavelet transform images data based on energy, even when an RTE value is similar, the data may show completely different characteristics when imaged. Therefore, a model that extracts a significant feature from the wavelet-transformed result through the machine learning technique according to the present disclosure is formed.

First, vehicle body acceleration data of National Highway Traffic Safety Administration (NHTSA) DATA was subjected to the wavelet transform and converted into a database, and in FIG. 5, the overall model architecture according to the present disclosure includes an input unit (Input), a crash performance model (Model), and an output unit (Output).

The input unit receives a train data set for modeling and a validation data set for validating the modeling from the data wavelet-transformed from the vehicle crash acceleration data.

Finally, the crash performance model completed by the present disclosure includes: an image transform operation by the wavelet transform by the input unit (S10); an operation of using the wavelet-transformed image data input to the input unit as an input of a pre-trained model (S20); an operation of concatenating a feature extracted from the pre-trained model with a performance index factor (S30); an operation of calculating a crash prediction result through an artificial neural network using the concatenated data as an input, as a trainable model (S40); and finally, an operation of outputting, by an output unit, crash performance or a crash grade prediction result from an injury value result (S50). An artificial neural network learning model may include a fully connected (FC) layer.

In this case, the pre-trained model uses a learned deep learning model to extract features inside the image from a large amount of image database, and as the deep learning model, a convolutional neural network (CNN) model that may extract a significant feature from data, such as an image, is used.

In addition, the input data set has low-frequency characteristics as meaning that the larger a wavelet scale value, the more scaling up and has high-frequency characteristics as the wavelet scale value decreases.

The model according to the present disclosure includes regression modeling and classification modeling in order to prevent overfitting and find an optimal model, and the modeling results according to the present disclosure are calculated as two types: an injury value and an injury grade.

Figure 6A:
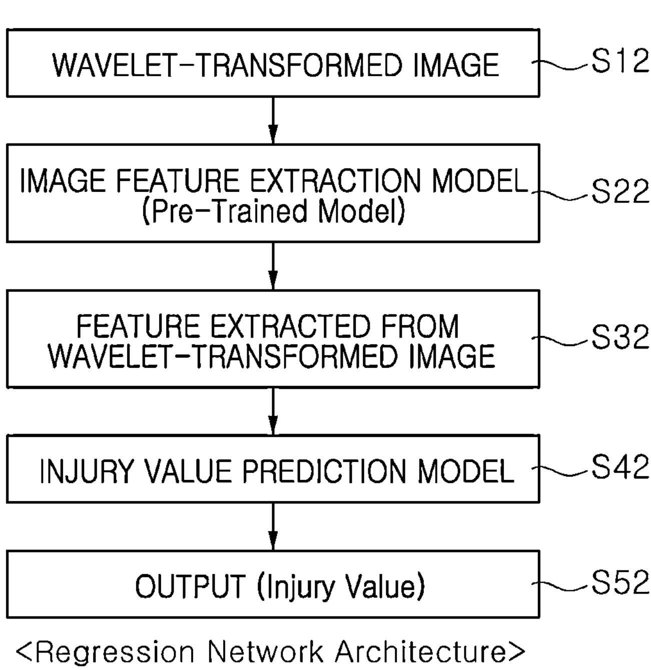
FIGS. 6A and 6B are views illustrating deep learning models, where

FIG. 6A illustrates a case in which the regression model is applied to calculate the injury value. Features of the wavelet-transformed image data are extracted and injury value prediction is performed in the crash performance model.

Figure 6B:
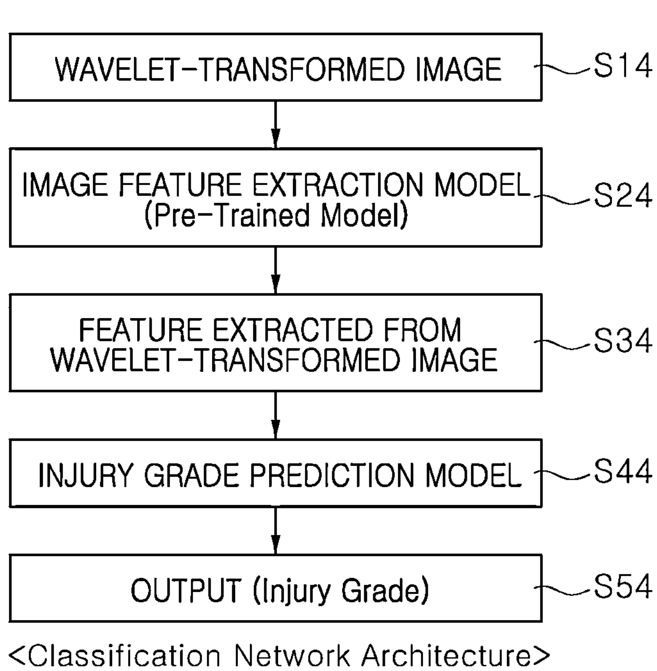

FIG. 6B illustrates a case in which the classification model is applied to calculate the injury grade. The features of the wavelet-transformed image data are extracted and injury grade prediction is performed in the crash performance model.

The regression model in FIG. 6A is a model that extracts the features of the wavelet image and performs the injury value prediction. The regression model includes: an image transform operation by the wavelet transform (S12); an operation of using the wavelet-transformed image as an input of the pre-trained model (S22); an operation of concatenating the outputs (extracted features) coming from the pre-trained model with factors, such as an RTE and a Peak G through concatenation calculation (S32); an operation of performing the artificial neural network learning using a result of the concatenation calculation as an input of FC layer learning (S42); and an operation of deriving the injury value (prediction result) as a final output after the artificial neural network learning is finished (S52).

Here, the RTE denotes the body pulse severity grade and is energy absorbed by the restraint device among all energies of the vehicle in the event of crash. The lower an RTE value, the better an energy sharing rate of the structure. The Peak G denotes a maximum value of the vehicle acceleration in a crash section. The R/Time denotes a rebound time, is an x-intercept time of a vehicle speed and is a result of integrating an acceleration once. The D/Crush is a vehicle displacement value.

The classification model in FIG. 6B is a model that extracts features of an image transformed by wavelet transform. The classification model includes: a step of an image transform operation by the wavelet transform (S14); a step of using the wavelet-transformed image as an input of the pre-trained model (S24); a step of concatenating outputs (extracted features) coming from the pre-trained model with factors such as an RTE and a Peak G through concatenation calculation (S34); a step of performing artificial neural network learning using the concatenation calculation result as an input and labels are used by one-hot-encoding (S44); and a step of deriving an injury grade (classification result) as a final output after finishing the artificial neural network learning in the FC layer (S54).

For model verification and results, the original data set is classified into a train data set and a test data set, and some of the train data are used as validation data. In other words, in order to secure that a designed model has versatility rather than performance biased toward some test data, model learning is performed through three types of data divisions. The data set largely includes a data set for learning the model and a data set for verifying the learned model, i.e., a data set for selecting a model with the best performance among several learned models and a data set for evaluating final performance of a lastly selected model.

As a performance index of the regression modeling, a mean squared error (MSE), which is a technique of obtaining an average by squaring a difference between a correct answer and a deep learning predicted result value, is used as a loss function. A mean absolute error (MAE), which is a technique of obtaining an absolute value of the difference between the deep learning model predicted value and the correct answer, is used as the loss function. Here, the loss function is a type of hyperparameter, is a variable determined inside a parameter model, and may not be arbitrarily adjusted by the user, while the hyperparameter uses a value directly set by the user upon modeling and is required to estimate parameters of the model.

$$MSE = \frac{1}{n}\sum_{i=1}^{n}(y_i - \hat{y}_i)^2 \quad \text{[Equation 1]}$$

In Equation 1, $y_i$ denotes the correct value, and $\hat{y}_i$ denotes the predicted value.

$$MAE = \frac{\sum_{i=1}^{n}|y_i - x_i|}{n} \quad \text{[Equation 2]}$$

In Equation 2, $y_i$ denotes the predicted value, $x_i$ denotes the correct value, and n denotes the number of samples.

Meanwhile, the index that evaluates prediction accuracy of the learned deep learning classification model is Accuracy, which is a method of calculating a relative proportion of an error in a real value by dividing a difference between the real value and a predicted value by the real value, obtaining an absolute value of the relative proportion, and then calculating an average.

Figure 7A:
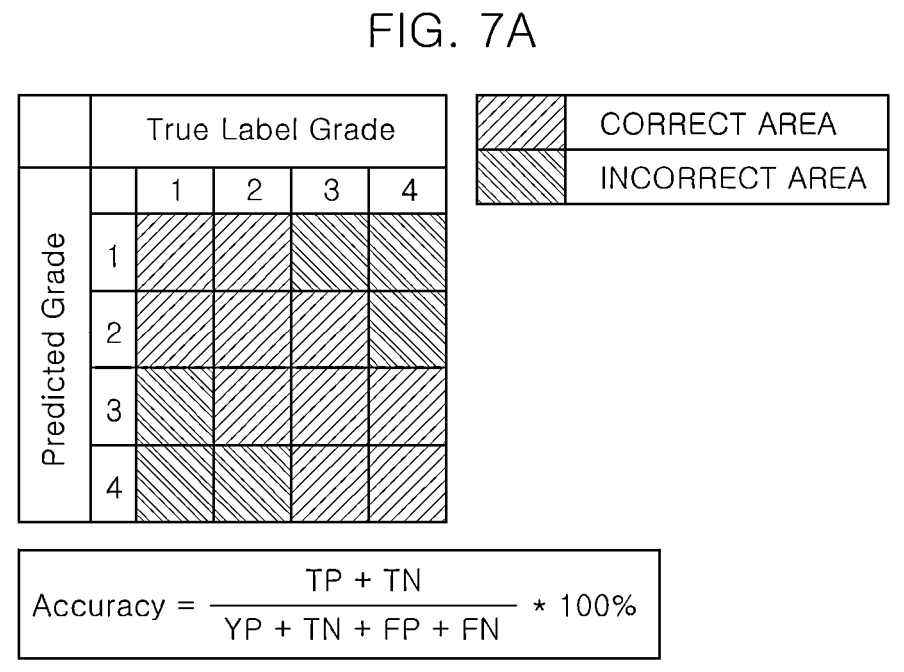

In the present disclosure, a Top-N Accuracy method is used to express accuracy, which may be standard accuracy of real classes identical to N classes with the highest possibility predicted from the classification model as illustrated in FIG. 7A. Top-2 Accuracy indicates prediction accuracy of the learned deep learning classification model. The Top-2 Accuracy is accuracy in which a threshold is set up to ±1 grades compared to a real label and has an increased range of a true positive (TP) area.

Figure 7B:
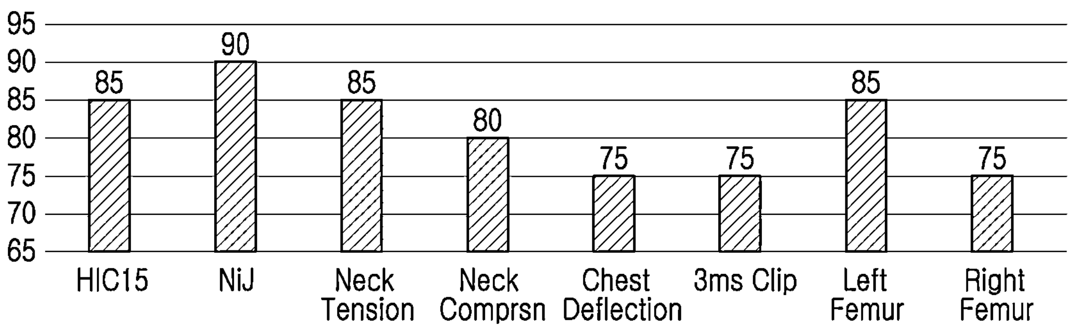
Figure 7B:
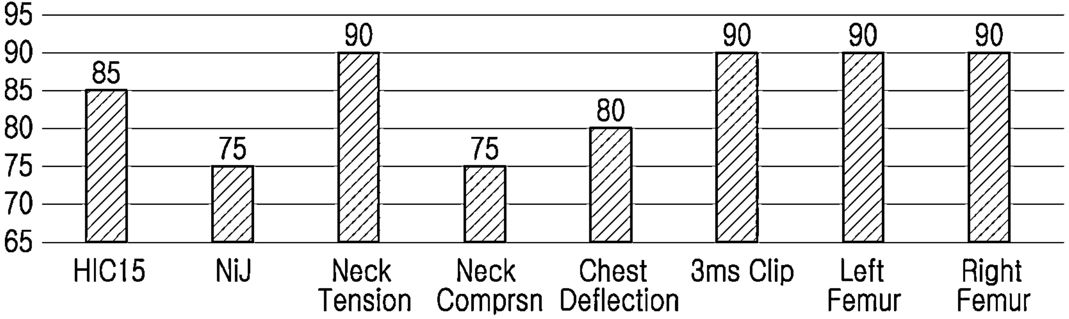

As illustrated in FIG. 7B, values of the Top-2 Accuracy for each injury value are compared through the classification modeling. As a result, for a driver's seat, the accuracy of 85/90/75/75/75 to 85% is shown in the order of HIC/Nij/Chest D/3 ms clip/Femur, and for a passenger's seat, the accuracy of 85/75/80/90/90% is shown in the order of HIC/Nij/Chest D/3 ms clip/Femur. Since these are classification values in an injury section divided based on learned labeling data, the result values previously predicted in the regression modeling are shown as being not overfitted.

As illustrated in FIG. 8, as a result of comparing the accuracy of the excellent prediction performance model for each injury value through the regression modeling, for the driver's seat, the accuracy of levels of 70.0/86.4/85.4/90.5/50.6 to 77.6% is shown in the order of HIC/Nij/Chest D/3 ms clip/Femur, and for the passenger's seat, the accuracy of levels of 86.7/84.7/81.9/95.6/58.1 to 43.3% is shown in the order of HIC/Nij/Chest D/3 ms clip/Femur for each injury.

Frontal crash performance may vary depending on not only the body acceleration but also a restraint device, a layout, and interior components. However, when the present disclosure is applied, there is an advantage in that learning and prediction are possible by only the wavelet transform of the body acceleration even without directly including the restraint device, the layout, and the interior components.

What is claimed is:

1. A method of predicting crash performance based on deep learning from vehicle crash acceleration data, the method comprising:

performing, by an input unit, wavelet transform on the vehicle crash acceleration data;

applying wavelet transform data to a pre-trained model;

concatenating a feature extracted from the pre-trained model with a vehicle crash performance index; and calculating a crash prediction result in a crash performance model through artificial neural network learning from concatenated data of the vehicle crash performance index and the extracted feature.

2. The method according to claim 1, wherein the pre-trained model is a learned deep model configured to learn an image and extract a feature inside the image.

3. The method according to claim 1, wherein the crash prediction result is a crash part injury value.

4. The method according to claim 1, wherein the wavelet transform images the vehicle crash acceleration data into image data.

5. The method according to claim 4, wherein the wavelet-transformed image data is image data with 3-channel R, G, B type colors, a color indicates an energy coefficient, and the image data is an image labeled so that an energy difference is represented as a color difference.

6. The method according to claim 1, wherein a mother function of the wavelet transform is selected as a Ricker wavelet.

7. The method according to claim 1, wherein the crash performance model includes a regression model configured to predict an injury value or a classification model that predicts an injury grade.

8. The method according to claim 1, wherein the vehicle crash performance index includes any one or more among a restraint energy (RTE), a maximum dynamic crush (MDC), a rebound time (R/Time), and a Peak G.

* * * * *